March 31, 1964   E. H. KURT   3,126,754
DRILL MOUNTING
Filed Oct. 13, 1960   2 Sheets-Sheet 2
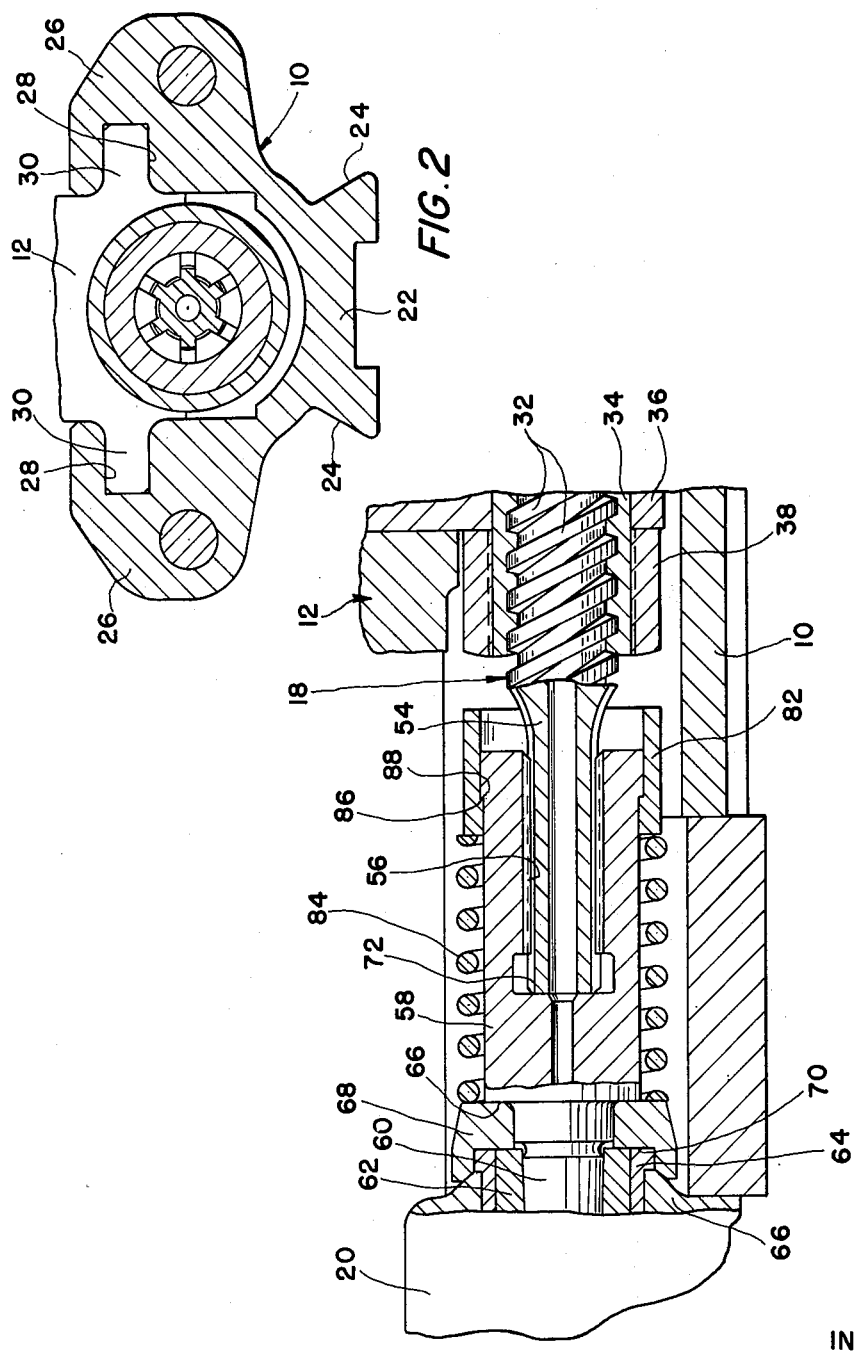
INVENTOR
EWALD H. KURT
BY
HIS ATTORNEY

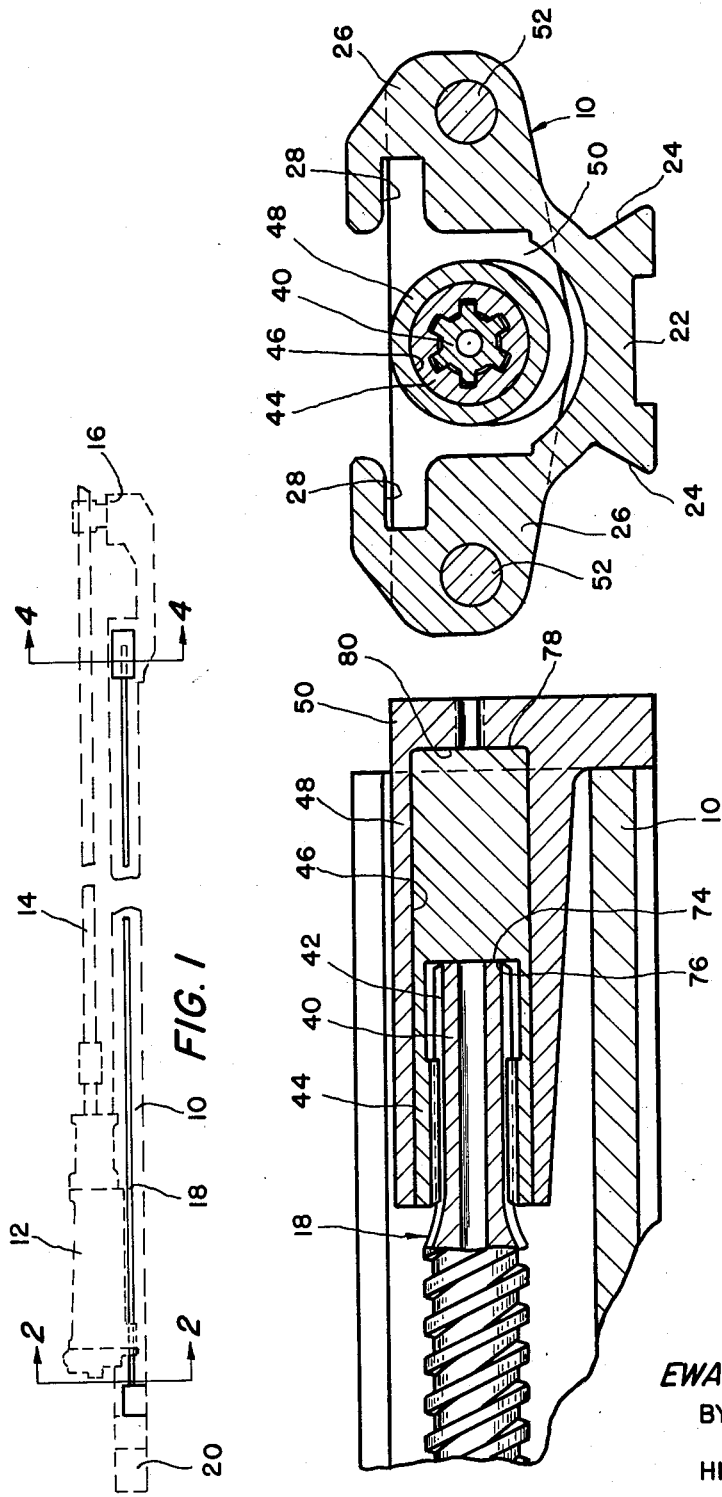

United States Patent Office 3,126,754
Patented Mar. 31, 1964

3,126,754
DRILL MOUNTING
Ewald H. Kurt, Phillipsburg, N.J., assignor to Ingersoll-Rand Company, New York, N.Y., a corporation of New Jersey
Filed Oct. 13, 1960, Ser. No. 62,360
3 Claims. (Cl. 74—424.8)

This invention relates to mountings for drills and particularly for percussive type rock drills in which the drill is advanced with respect to a stationary guide as the depth of hole increases.

The invention has for its object to provide an improved form of mounting in which the life of the parts will be increased and which tends to eliminate destructive shocks.

Other objects and advantages of the construction will be in part obvious and in part pointed out in the following description of a preferred embodiment of the invention taken with the drawing wherein:

FIGURE 1 is a longitudinal elevational view of a mounting supporting a drill and its drill rod, with the drill and drill rod being shown in dotted lines, FIG. 2 is a section taken along the line 2—2 in FIG. 1 looking in the direction of the arrows, FIG. 3 is a longitudinal axial section of the rear end of the mounting assembly, FIG. 4 is a sectional view taken along the line 4—4 in FIG. 1 looking in the direction of the arrows, and FIG. 5 is an axial section of the front end of the drill mounting.

Referring to the drawing, the mounting includes a guide shell 10 upon which is mounted a conventional percussive type rock drill 12 having a drill rod or steel 14 extending forwardly thereof and guided by a suitable drill steel centralizer 16. Drill 12 is adapted to be advanced forwardly and be retracted by means of a suitable feed screw 18 adapted to be rotated by a motor 20.

Guide shell 10 is of the type having a base portion 22 provided with divergent side surfaces 24 for engagement by a suitable clamp (not shown). Extending upwardly from base 22 are side portions 26 having grooves 28 to receive laterally extending arms 30 formed integrally with drill 12 to maintain drill 12 in position on guide shell 10 as the drill moves forwardly, as drilling progresses. Feed screw 18 is threaded at 32 to engage feed nut 34 carried by a boss 36 extending downwardly from the body of drill 12 and located between the upwardly extending portions 26 of the guide shell. Feed nut 34 is held in place in boss 36 by a suitable nut 38 threaded thereon and extending rearwardly with respect to drill 12.

Feed screw 18 is alike at both ends and is adapted to be reversibly mounted in the guide shell. The mounting of its front end 40 is shown in FIGS. 4 and 5. The front end 40 is provided with splines 42 slidingly engaged with a matingly splined socket of a cylindrical bearing 44 fitting within the cylindrical bore 46 of a bracket 48. The end of the bracket has a flange 50 secured to the end of guide shell 10 by suitable cap screws 52. The opposite or rearward end 54 of feed screw 18 is also splined and fits into a splined socket 56 of a chuck 58 integrally formed with the shaft 60 of motor 20. Shaft 60 is provided with a bearing 62 inserted in a flanged bushing 64 resting against the casing portion 66 or motor 20. Interposed between chuck 58 and the casing shoulder 66 is a thrust collar 68 encircling bushing 64 and bearing against that bushing at its inner flat surface 70. Chuck 58 is provided with a flat face 72 against which the end of feed screw end 54 abuts and exerts thrust in a rearward direction as drill 12 advances.

The forward end 40 of feed screw 18 likewise has an end face 74 which bears against the flat inner surface 76 of bearing 44 for transmitting thrust of feed screw 18 in a forward direction as drill 12 advances. The resulting thrust on bearing 44 is transmitted to bracket 48 by the end face 78 of bracket 48 bearing against the bottom face 80 of bore 46.

As drill 12 reaches the end of its rearward travel on shell 10, it strikes a spring buffer comprising a sleeve 82 slidingly mounted on the exterior of chuck 58 and projecting forwardly therefrom. Sleeve 82 is urged in its forward position by a coil spring 84 encircling chuck 58 and interposed between sleeve 82 and thrust collar 68. Spring 84 should be powerful enough to at least retard the rearward motion of drill 12 upon contact of sleeve 82 with chuck nut 38. Sleeve 82 is held on chuck 58 by interengaging shoulders 86 and 88 on chuck 58 and sleeve 82, respectively.

It will be seen that as drill 12 advances on guide shell 10 by rotation of feed screw 18 engaging chuck 58 of motor 20, feed screw 18 will be in compression and exert thrust against chuck 58 which transmits its force against thrust collar 68 and the motor casing 66 through the flanged bushing 64. There will be no thrust in motor 20. Wear in the feed screw is generally greater on threads 32 during the forward motion of drill 12, and there may also be considerable wear on the splines at the rear end 54 of feed screw 18. There will be substantially no wear at the front bearing 44 nor on the front splined end 40 of feed screw 18, either in forward or backward motion of drill 12, and the splines at the front end remain substantially new. Likewise the rear face of threads 32 receives very little wear on the withdrawal of drill 12. The symmetrical arrangement, fore and aft, of feed screw 18 enables it to be mounted alternately with either end engaged in the chuck 58 so that the major wear on its threads can be distributed over both sides or faces of the threads, to provide it with substantially twice the normal life of a conventional feed screw used in a rock drill apparatus.

Thus, are accomplished among others, the advantages and objects hereinbefore referred to.

I claim:
1. A rock drill apparatus comprising: a guide shell; a drill slidably mounted on said guide shell and adapted to be advanced along it; a rotary feed motor mounted on one end of said guide shell; a bearing mounted on the other end of said guide shell; a feed screw mounted on and between said feed motor and said bearing and threadably engaging said drill for advancing it along said guide shell; and means for removably and alternately connecting either end of said feed screw in driven relationship to said feed motor, whereby said feed screw can be reversed end-for-end in its mountings on said guide shell to extend the wear life of said feed screw.

2. The apparatus of claim 1 wherein: both ends of said feed screw are splined and substantially identical; and said apparatus includes a splined socket on said feed motor arranged to alternately receive either end of said feed screw.

3. The apparatus of claim 2 wherein said bearing includes a splined socket adapted to alternately receive either end of said feed screw.

References Cited in the file of this patent
UNITED STATES PATENTS

| | | |
|---|---|---|
| 1,626,568 | Thomas | Apr. 26, 1927 |
| 2,208,751 | Dicker | July 23, 1940 |
| 2,341,472 | O'Farrell | Feb. 8, 1944 |
| 2,581,805 | Maxson | Jan. 8, 1952 |
| 2,905,440 | Gerentes | Sept. 22, 1959 |